Sept. 26, 1950  G. E. WATSON  2,523,345
TARGET-ANGLE TRAINER

Filed Sept. 13, 1946  2 Sheets-Sheet 1

INVENTOR.
GEORGE E. WATSON
BY
ATTORNEY

Sept. 26, 1950        G. E. WATSON        2,523,345

TARGET-ANGLE TRAINER

Filed Sept. 13, 1946        2 Sheets-Sheet 2

INVENTOR.
GEORGE E. WATSON
BY
*M. O. Hayes*

ATTORNEY

Patented Sept. 26, 1950

2,523,345

UNITED STATES PATENT OFFICE 2,523,345

TARGET-ANGLE TRAINER

George E. Watson, United States Navy

Application September 13, 1946, Serial No. 696,967

5 Claims. (Cl. 35—25)

(Granted under the act of March 3, 1883, as amended April 30, 1928; 370 O. G. 757)

This invention relates in general to a training device and in particular to a target-angle trainer that is adapted to acquaint students with the appearance of objects from various angles and to enable them to determine readily the relative angle of the object.

In training military and naval students, it is customary to train the students to identify ships, aircraft and other military and naval equipment from various angles so that the students are able to recognize friendly and enemy forces and with extreme speed be able to determine the angle of approach of such forces. Inasmuch as great numbers of students must be trained, it has been necessary to resort to classroom teaching rather than to individual instruction, with certain previously unavoidable difficulties. For example in the identification of war ships and in angle identification, i. e., determination of the angle of the ship's heading with respect to the direction between the ship and the person sighting it, it is the usual practice for the instructor to place a model of the ship on a flat surface in front of the class of students, at an angle which he chooses. In such a situation a student directly in front of the instructor sees the ship from one angle whereas a student noticeably to one side or the other sees the ship from a decidedly different angle. This is a serious drawback to the effectiveness of the instruction. Numerous other difficulties of greater or lesser effect likewise exist in conventional methods.

It is an object of this invention to provide a training device that is adapted to present an object, e. g., a model of military or naval equipment, to a student in a predetermined position and angle.

It is another object to provide a target-angle trainer for military identification training that is adapted to present a model of military or naval equipment to a student in a predetermined position and angle.

It is another object to provide a target-angle trainer comprising a pointer having means thereon for replaceably and rotatably mounting a model at a predetermined angle and adapted to present the model to a student at such an angle.

Further objects and advantages of this invention, as well as its construction, arrangement and operation will be apparent from the following description and claims in connection with the accompanying drawings, in which:

Figure 1:
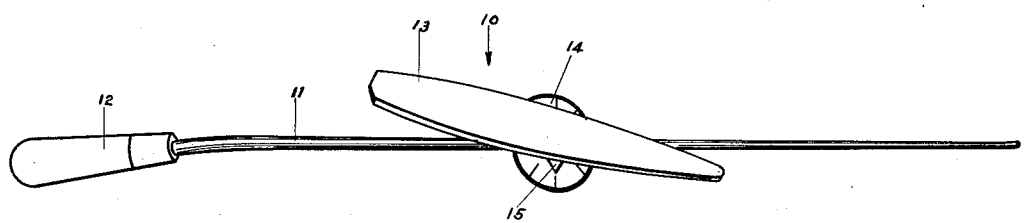
Fig. 1 is an isometric view of the training device according to one form of the invention with the superstructure of the model ship omitted.
Figure 2:
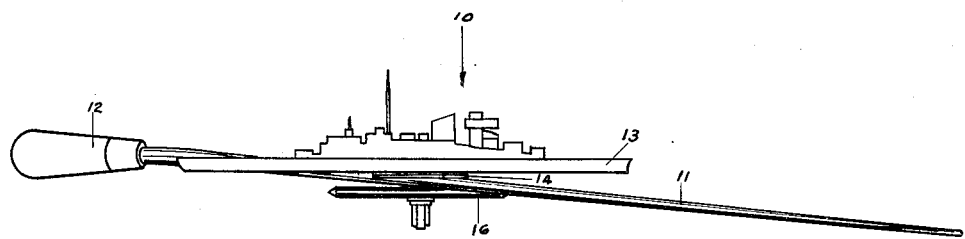
Fig. 2 is a side elevation of the device shown in Fig. 1.

There is shown in Figs. 1 and 2 a target-angle trainer generally designated 10 comprising a pointer 11 having a handle 12 at one end thereof and adapted to mount a model 13.

Along the pointer 11 and at its upper surface is mounted a scale 14 which is graduated to indicate the angle of the model with respect to the pointer. The fineness of the graduations is optional; however, for most training purposes it is sufficient if the scale is graduated into eight-circles, i. e., 45 degree graduations, or at most into sixteenth-circles, i. e., twenty-two and a half degrees. Preferably these graduations are numbered in degrees from zero to 360 to indicate in naval terminology the bearing of the model with respect to the direction of the pointer, and so positioned that a reading of zero is obtained when the ship faces the same direction as the pointer.

Rotatably positioned along the upper surface of the scale 14 is an indicator 15 which points around the scale to one of the markings thereon to indicate the relative angle between the pointer and the model. Preferably, this indicator 15 is in a fixed and predetermined position with respect to the model 13.

Optionally, there is provided as shown in Fig. 2 a cross-member 16 rotatably positioned on the underside of pointer 11 and which in the use of the device can be positioned at right angles with respect to the pointer, thereby dividing the horizontal field around the pointer in visually separated quadrants. In the form of the invention shown in Fig. 2, this cross-bar 16 is rotatable with respect to the pointer 11 whereby the cross-bar can be positioned at right angles to the pointer in order to illustrate the relationship between the various quadrants and the numerical bearing, and when this feature is not desired, the cross-bar 16 can be swung parallel with and adjacent to the pointer 11 to remove this artificial aid to angle identification.

Figure 3:
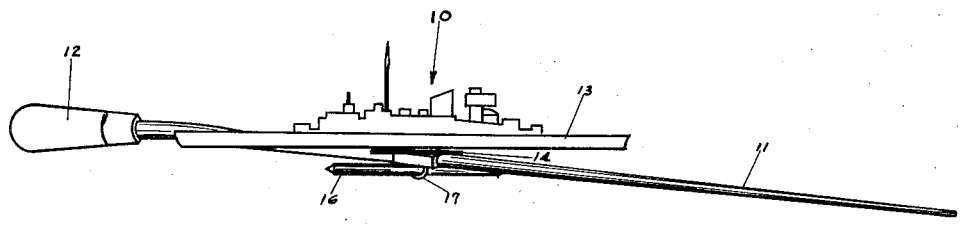
Fig. 3 is an isometric view of a trainer device according to another form of this invention.

Fig. 3 shows another form of this invention comprising a pointer 11 having a model 13 rotatably positioned thereon and having a scale 14 and indicator 15 (Fig. 4) to show the relative position of the model with respect to the pointer. In this form of the invention, there is a cross-bar 16 positioned below the pointer 11 and retained in a fixed position by means of stud 17 integrally mounted on the pointer 11.

The use and operation of this form of the invention is similar to the use and operation of the form used in Figs. 1 and 2. If desired, the cross-bar 16 can be removably mounted on the pointer 11, and can be removed therefrom when it is not desired for training purposes.

Figure 4:
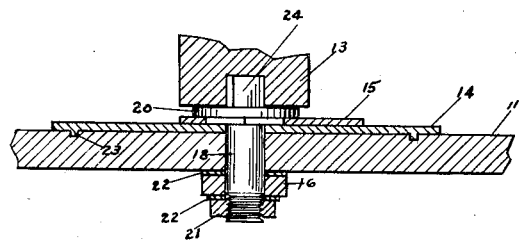
Fig. 4 is a fragmentary side elevation in cross-section showing the mechanism for moving the model on the training device according to one form of the invention; and, Fig. 5 is an isometric view of a bolt according to the form of the invention shown in Fig. 4.
Figure 5:
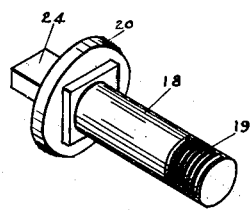

In Figs. 4 and 5 there is shown a means of mounting a model 13 and the angle-indicating means on the pointer 11. A bolt 18 having a threaded portion at one end and having a collar or flange 20 near the other end is passed through the pointer 11, scale 14 and indicator 15 with the flange 20 bearing against the upper surface of the indicator 15 and pressing the scale toward the pointer 11. The bolt 18 is secured in position by means of a conventional nut 21, which can for convenience of use be a wing nut if so desired. Optionally, projections 23 on the surface of scale 14 engage the pointer 11 and fix the scale in a correct position with respect to the pointer. The bolt is loosely secured into position so as to permit scale 14 and pointer 11 to rotate with respect to the bolt. Washers 22 provide rotatable bearing surfaces where needed. A lock nut (not shown) is provided, if desired.

Extending above collar 20 is a head 24 on the bolt which preferably is of an irregular shape and which is adapted to fit in a hole in the indicator 15 and a recess in the model 13. The irregular shape of this head 24 causes the model 13 to be located thereon in a predetermined position and to be fixed in the relative position with respect to the bolt while the pointer and scale 14 are rotated. The head 24 of the bolt is irregular in shape rather than squared so that there is a definite and predetermined front and rear edge on this head whereby the model is automatically correctly faced upon the bolt 18. Below the collar 20 is an enlarged section, for example a hexagonal section to fit in a hexagonal hole through the indicator 15, fixing the indicator with respect to the bolt 18.

In this way, the model 13 is replaceably mounted on the pointer 11 always with the certainty that the model is in the correct relative position as indicated by the reading of the indicator 15 on scale 14. A series of models can be designed to fit on the head 24 of bolt 18 thereby providing a series of training objects to be used in conjunction with the training device disclosed herein.

The use of this training device in class instruction or in individual instruction is simple and readily apparent from the construction thereof. An identification article, for example a model of a warship, is correctly positioned upon the device and is rotated to a desired angle with respect to the pointer as indicated by the scale reading. The instructor then directs the pointer toward a particular student who then sees the model from the correct predetermined angle. The cross-bar 16 can optionally be positioned at right angles to the pointer in order to outline clearly the various quadrants or alternatively the cross-bar can be positioned along and parallel with the pointer. During early class instruction, it is found best to use the cross-bar to indicate the quadrants while in more advanced instruction, the cross-bar is unnecessary or even disadvantageous.

In addition to the use in identifying and recognizing land or sea equipment and in angle identification in connection with this equipment, the training device can also be used in the identification of aircraft and in angle identification thereof. When the training device is used in connection with aircraft, the model of the aircraft can be positioned on the pointer at either a vertical angle or a horizontal angle so that the student gains practice in identification of aircraft from various horizontal and vertical angles. Similarly it will be in the ability of those skilled in the art to provide on the trainer both horizontal and vertical angle adjustment with an additional scale to indicate the vertical angle, in which case the student can be presented with various oblique views of the model.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A training device comprising a rod-shaped pointer visible from all directions, an identification article rotatably mounted along the pointer, the axis of rotation being substantially perpendicular to the rod longitudinal axis, and means mounted on the pointer for determining the relative angle between identification article and the pointer.

2. A training device comprising a rod-shaped pointer visible from all directions, an identification article removably and rotatably mounted along the pointer, the axis of rotation being substantially perpendicular to the rod longitudinal axis, and a scale affixed to the pointer at the location where the identification article is mounted to indicate the angle between the identification article and the pointer.

3. A training device comprising a rod-shaped pointer visible from all directions having a cross-member rotatably mounted thereon, an identification article rotatably mounted on the pointer substantially at the intersection between said pointer and said cross-member, the axis of rotation being substantially perpendicular to the rod longitudinal axis, and a scale affixed to the pointer to indicate the angle between the pointer longitudinal axis and the identification article longitudinal axis.

4. A training device comprising a rod-shaped pointer visible from all directions, a cross-member rotatably mounted on said pointer, an identification article removably and rotatably mounted on the pointer substantially at the intersection between the pointer and the cross-member, the axis of rotation being substantially perpendicular to the rod longitudinal axis, and a scale mounted on the pointer substantially at the intersection between the pointer and the cross-member to indicate the angles between the identification article longitudinal axis and the pointer longitudinal axis and between the cross-member longitudinal axis and the pointer longitudinal axis.

5. A training device comprising a rod-shaped pointer having a straight longitudinal axis and visible from all directions, said pointer at one end being enlarged to form a handle, said pointer at the other end converging substantially to a point, a cross-member mounted on said pointer and adjustable about a second axis substantially perpendicular to the pointer axis, an identification article removably mounted on said pointer for rotation about the second axis, a compass scale element and an indicator element mounted for relative movement about the second axis, one of said elements being mounted on said pointer and the other of said elements being mounted on said article for indicating the angle between said pointer axis and the longitudinal axis of said article and said cross-member.

GEORGE E. WATSON.

REFERENCES CITED

The following references are of record in the file of this patent:

UNITED STATES PATENTS

| Number | Name | Date |
|---|---|---|
| 335,647 | Spencer | Feb. 9, 1886 |
| 782,811 | Ames | Feb. 21, 1905 |
| 1,258,160 | Slater | Mar. 5, 1918 |
| 2,404,386 | Levine et al. | July 23, 1946 |
| 2,418,834 | Hartman | Apr. 15, 1947 |